United States Patent
Hsieh et al.

(10) Patent No.: US 7,268,847 B2
(45) Date of Patent: Sep. 11, 2007

(54) IN-PLANE SWITCHING MODE THIN FILM TRANSISTOR LIQUID CRYSTAL DISPLAY DEVICE WITH TWO DOMAINS

(75) Inventors: Tsau-Hua Hsieh, Miao-Li (TW); Jia-Pang Pang, Miao-Li (TW); Chueh-Ju Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 359 days.

(21) Appl. No.: 10/996,917

(22) Filed: Nov. 24, 2004

(65) Prior Publication Data
US 2005/0134780 A1 Jun. 23, 2005

(30) Foreign Application Priority Data
Dec. 23, 2003 (TW) .............................. 92136524 A

(51) Int. Cl.
*G02F 1/1343* (2006.01)
*G02F 1/1337* (2006.01)

(52) U.S. Cl. ...................... 349/139; 349/141; 349/146; 349/129

(58) Field of Classification Search ................ 349/139, 349/141, 146, 129
See application file for complete search history.

(56) References Cited

U.S. PATENT DOCUMENTS

| | | | |
|---|---|---|---|
| 6,184,961 B1 * | 2/2001 | Ham | 349/141 |
| 6,512,565 B1 * | 1/2003 | Lee et al. | 349/130 |
| 6,636,289 B2 * | 10/2003 | Yoo et al. | 349/141 |

* cited by examiner

*Primary Examiner*—Mike Qi
(74) *Attorney, Agent, or Firm*—Wei Te Chung

(57) ABSTRACT

An LCD device (2) includes two substrates (21, 22), a liquid crystal layer (27) therebetween, and gate lines (24) and data lines (23) formed on one of the substrates thereby defining pixel regions. A set of pixel electrodes (26) and a set of common electrodes (25) are provided in each pixel region. The pixel and common electrodes are shaped as hollow rectangles, and are alternately nested one within the other. When a voltage is applied, a horizontal electric field in two different directions (281, 282) is established. Liquid crystal molecules of the liquid crystal layer are twisted according to the two directions, thereby reducing color shift.

10 Claims, 6 Drawing Sheets

IN-PLANE SWITCHING MODE THIN FILM TRANSISTOR LIQUID CRYSTAL DISPLAY DEVICE WITH TWO DOMAINS

BACKGROUND OF THE INVENTION

1. Field of the Invention

The present invention relates to a liquid crystal display (LCD) device, and more particularly to a two-domain in-plane switching (IPS) mode thin film transistor (TFT) LCD device.

2. Description of Prior Art

In a conventional liquid crystal display, a pair of facing transparent electrodes is respectively formed on two substrates, and is used for driving a liquid crystal layer therebetween. In such a device, a displaying means known as a TN (twisted nematic) display is adopted. That is, the liquid crystal display operates by being supplied with an electric field having a direction orthogonal to inner surfaces of the substrates.

However, the TN mode LCD has a narrow viewing angle, which means that the quality of the display greatly depends on the direction of viewing. In order to obtain a wide viewing angle, the IPS type LCD has been developed.

A detailed explanation about operation modes of a typical IPS-LCD device is provided hereinbelow, with reference to FIGS. 5 through 7.

As shown in FIGS. 5-6, the IPS-LCD device 1 comprises upper and lower substrates 11 and 12 spaced apart from each other, and a liquid crystal layer 17 sandwiched therebetween. The substrates 11 and 12 are called a color filter substrate and a TFT substrate, respectively. A multiplicity of pixel electrodes 16 and a multiplicity of common electrodes 15 are disposed on the lower substrate 12. The pixel electrodes 16 and the common electrodes 15 are parallel to but spaced apart from each other.

When no electric field is applied between the pixel and common electrodes 16 and 15, long axes of liquid crystal molecules in the liquid crystal layer 17 maintain a predetermined angle relative to the pixel and common electrodes 16 and 15.

As shown in FIG. 7, when a voltage is applied between the pixel and common electrodes 16 and 15, a horizontal in-plane electric field that is parallel to a surface of the lower substrate 12 is established between the pixel and common electrodes 16 and 15. The liquid crystal molecules are twisted so as to align according to the electric field. That is, the long axes of the liquid crystal molecules are oriented perpendicular to the pixel and common electrodes 16 and 15.

The IPS-LCD device 1 is a conventional single-domain IPS-LCD device. This type of IPS-LCD device has the following inherent problem. Because the pixel and common electrodes 16 and 15 are all oriented in a single direction, the liquid crystal molecules are rotated in a single direction only. This means that an associated display screen exhibits color shift when the display screen is obliquely viewed while displaying white.

It is desired to provide an improved liquid crystal display device which overcomes the above problem.

SUMMARY OF THE INVENTION

It is an object of the present invention to provide a liquid crystal display device having two electric field domains so as to reduce color shift.

In order to achieve the object set forth, a liquid crystal display device in accordance with the present invention includes a pair of substrates, a liquid crystal layer sandwiched between the substrates, and a plurality of gate lines and data lines formed on one of the substrates thereby defining a plurality of pixel regions. A set of pixel electrodes and a set of common electrodes are provided in each pixel region. The pixel and common electrodes are shaped as hollow rectangles, and are alternately nested one within the other. When a voltage is applied, a horizontal electric field in two different directions is established. Liquid crystal molecules of the liquid crystal layer are twisted according to the two directions, thereby reducing color shift.

Other objects, advantages, and novel features of the present invention will become more apparent from the following detailed description when taken in conjunction with the accompanying drawings.

DETAILED DESCRIPTION OF THE PRESENT INVENTION

Figure 1:
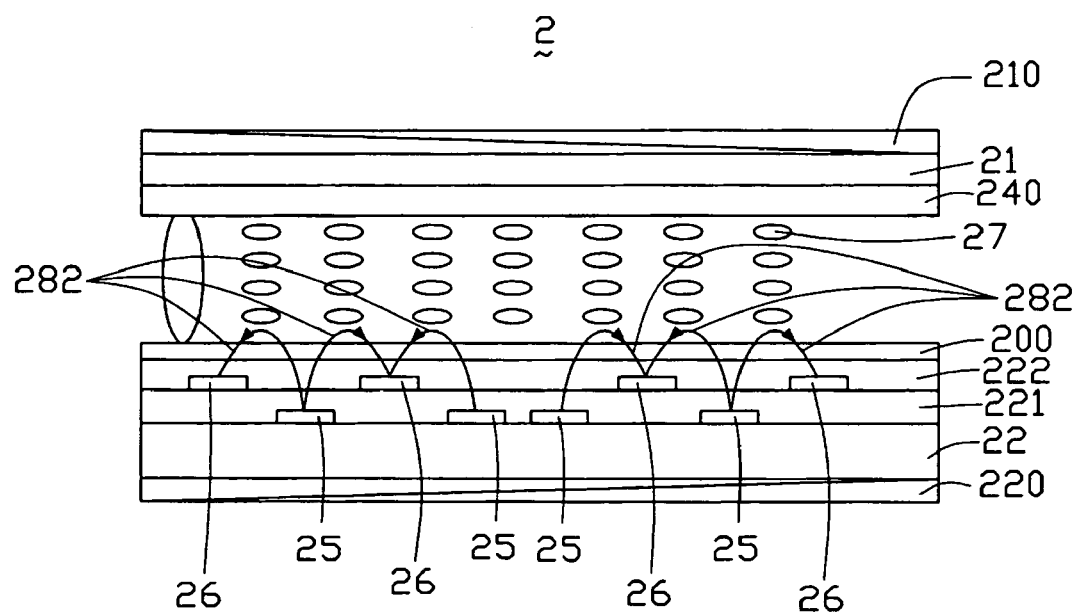
FIG. 1 is a schematic, side cross-sectional view of part of an LCD device according to a first embodiment of the present invention, shown when a voltage is applied thereto.

Referring to FIG. 1, an LCD device 2 of the first embodiment of the present invention includes a transparent first substrate 21, a transparent second substrate 22, and a liquid crystal layer 27 sandwiched between the first and second substrates 21 and 22.

A color filter 240 is provided on an undersurface of the first substrate 21 opposite to the second substrate 22. An alignment film 200 is coated on an inner side of the second substrate 22 opposite to the first substrate 21, such that the liquid crystal layer 27 is sandwiched between the alignment film 200 and the color filter 240. In a passive state, liquid crystal molecules in the liquid crystal layer 27 are substantially uniformly aligned in a direction according to the alignment film 200.

A polarizing plate 210 is adhered to an outer surface of the first substrate 21, and a polarizing plate 220 is adhered to an outer surface of the second substrate 22. The polarizing plates 210 and 220 respectively have polarizing axes perpendicular to each other, with one of the polarizing axes being set parallel to the direction in which the liquid crystal molecules are aligned in the passive state.

Common electrodes 25 are directly formed on a surface of the second substrate 22, and an insulating layer 221 is formed on said surface of the second substrate 22 such that it also covers the common electrodes 25. Pixel electrodes 26 are directly formed on a surface of the insulating layer 221, and a passivation film 222 is formed on said surface of the insulating layer 221 such that it also covers the pixel electrodes 26.

Figure 2:
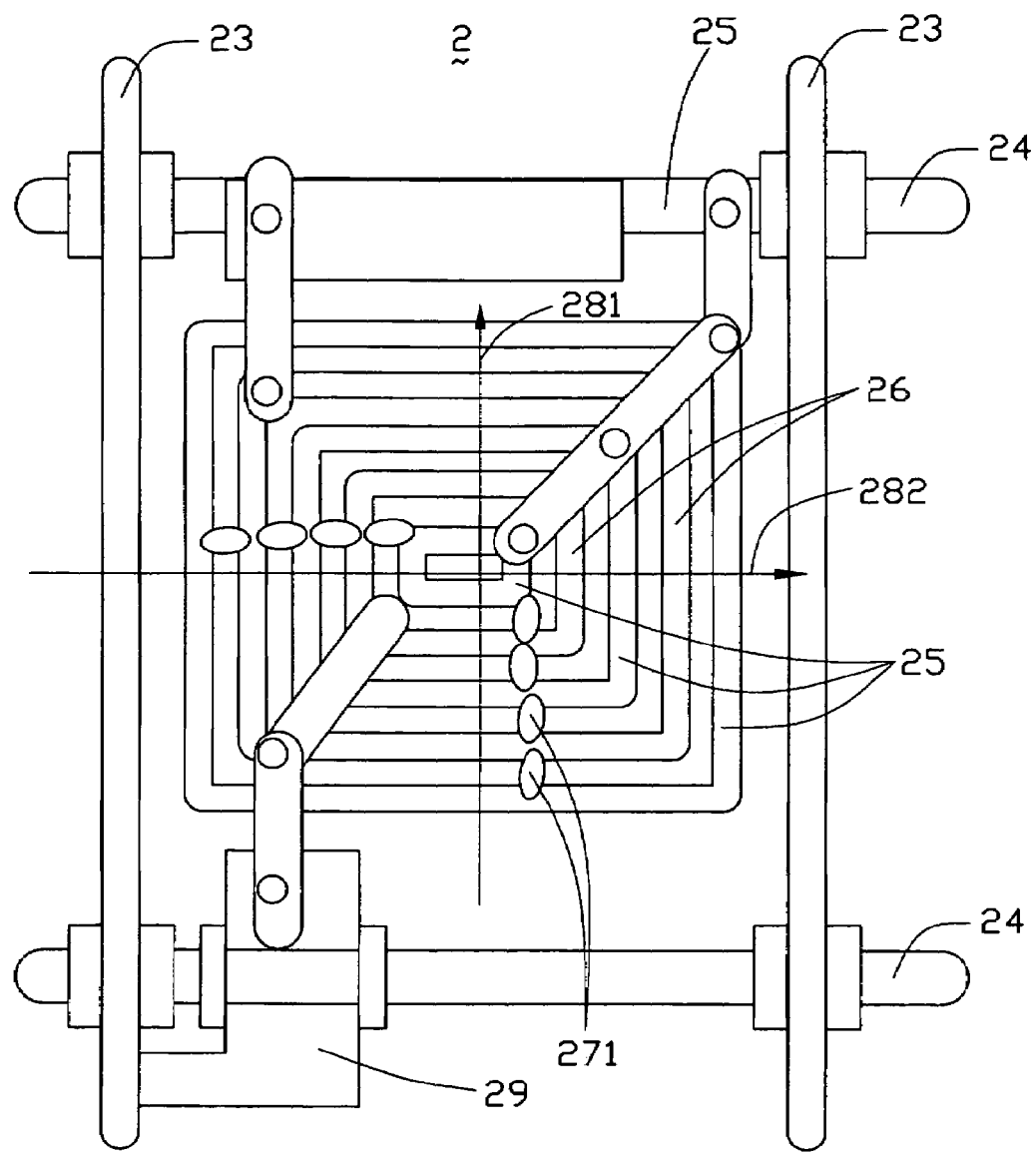
FIG. 2 is a top plan view of part of the LCD device shown in FIG. 1, showing a configuration of electrodes of the LCD device.

Also referring to FIG. 2, two parallel gate lines 24 orthogonally cross two parallel data lines 23, thereby defining a rectangular pixel region. A TFT device 29, a plurality of the pixel electrodes 26, and a plurality of the common electrodes 25 are provided in the pixel region.

The pixel and common electrodes 26, 25 are made of a transparent conductive material such as indium-tin-oxide (ITO) or indium-zinc-oxide (IZO). The pixel and common electrodes 26, 25 are shaped as a plurality of hollow rectangles, which are alternately nested one within the other. The sides of the hollow rectangles of the pixel and common electrodes 26, 25 are substantially parallel to the data lines 23 or gate lines 24 respectively. The pixel electrodes 26 connect to a drain electrode (not labeled) of the TFT device 29.

In operation, a common voltage is applied to the common electrodes 25, and another voltage is applied to the pixel electrodes 26. A horizontal electric field in two directions 281 and 282 is thereby established. That is, the directions 281, 282 are orthogonal to each other. Components of the electric field in the directions 281 and 282 span between respective adjacent sides of the hollow rectangles of the pixel and common electrodes 26, 25. The electric field causes liquid crystal molecules in the liquid crystal layer 27 to be twisted in a same plane that is parallel to the substrates 21 and 22, for controlling a corresponding display.

According to the configuration of the pixel and common electrodes 26, 25, an electric field is generated in the directions 281 and 282 that are different from each other, so as to form two electric field regions in the spaces defined between the pixel and common electrodes 26, 25. Accordingly, the liquid crystal molecules in the liquid crystal layer 27 are twisted in the two different directions 281 and 282.

As a result, when the display screen is obliquely viewed while displaying white, two different colors can be seen in two regions of the display screen corresponding to said two regions of said spaces of the LCD device 2. The two colors compensate for each other, thereby reducing color shift.

Figure 3:
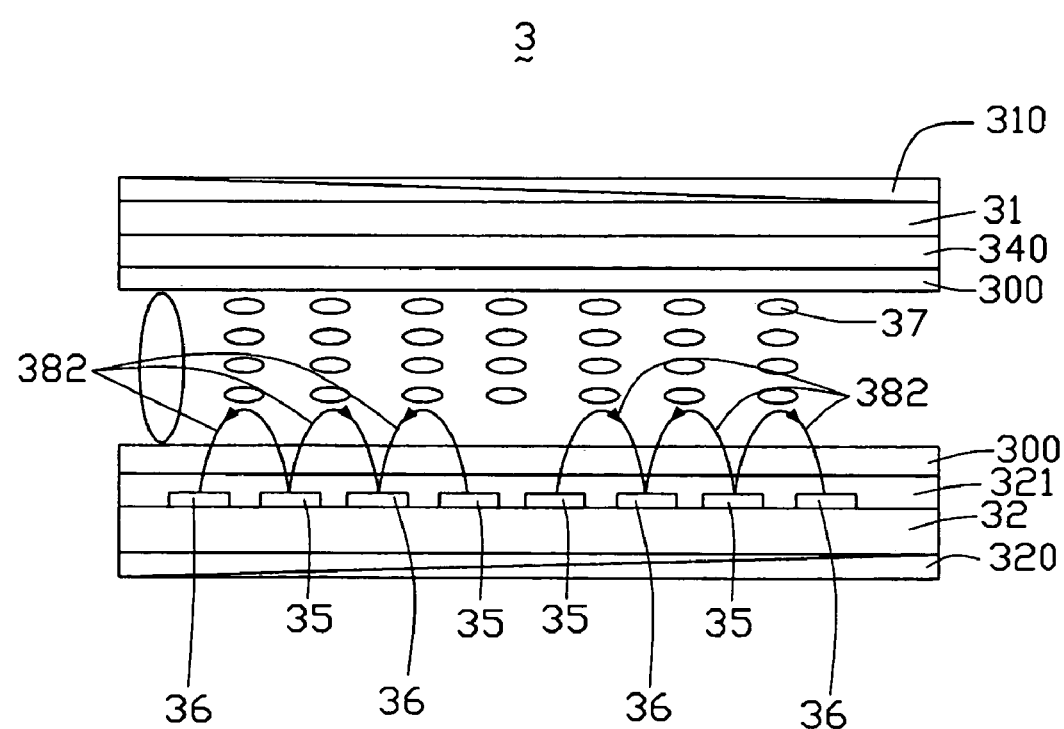
FIG. 3 is a schematic, side cross-sectional view of part of an LCD device according to a second embodiment of the present invention, shown when a voltage is applied thereto.

Referring to FIG. 3, an LCD device 3 according to the second embodiment of the present invention is shown. The LCD device 3 has a configuration similar to the LCD device 2 of the first embodiment. Upper and lower substrates 31 and 32 are spaced apart from each other, and a liquid crystal layer 37 is sandwiched therebetween.

A color filter 340 is provided on an undersurface of the upper substrate 31. An alignment film 300 is coated on an undersurface of the color filter 340, and another alignment film 300 is coated at an inner side of the lower substrate 32 nearest to the liquid crystal layer 37, such that the liquid crystal layer 37 is sandwiched between the alignment films 300. In a passive state, liquid crystal molecules in the liquid crystal layer 37 are substantially uniformly aligned in a direction according to the alignment films 300.

The upper and lower substrates 31 and 32 have polarizing plates 310 and 320 adhered to outer surfaces thereof, respectively. The polarizing plates 310 and 320 respectively have polarizing axes perpendicular to each other, with one of the polarizing axes being set parallel to the direction in which the liquid crystal molecules are aligned in the passive state.

Common and pixel electrodes 35 and 36 are directly formed on a surface of the lower substrate 32, and an insulating layer 321 is formed on said surface of the lower substrate 32 such that it also covers the common and pixel electrodes 35 and 36.

Figure 4:
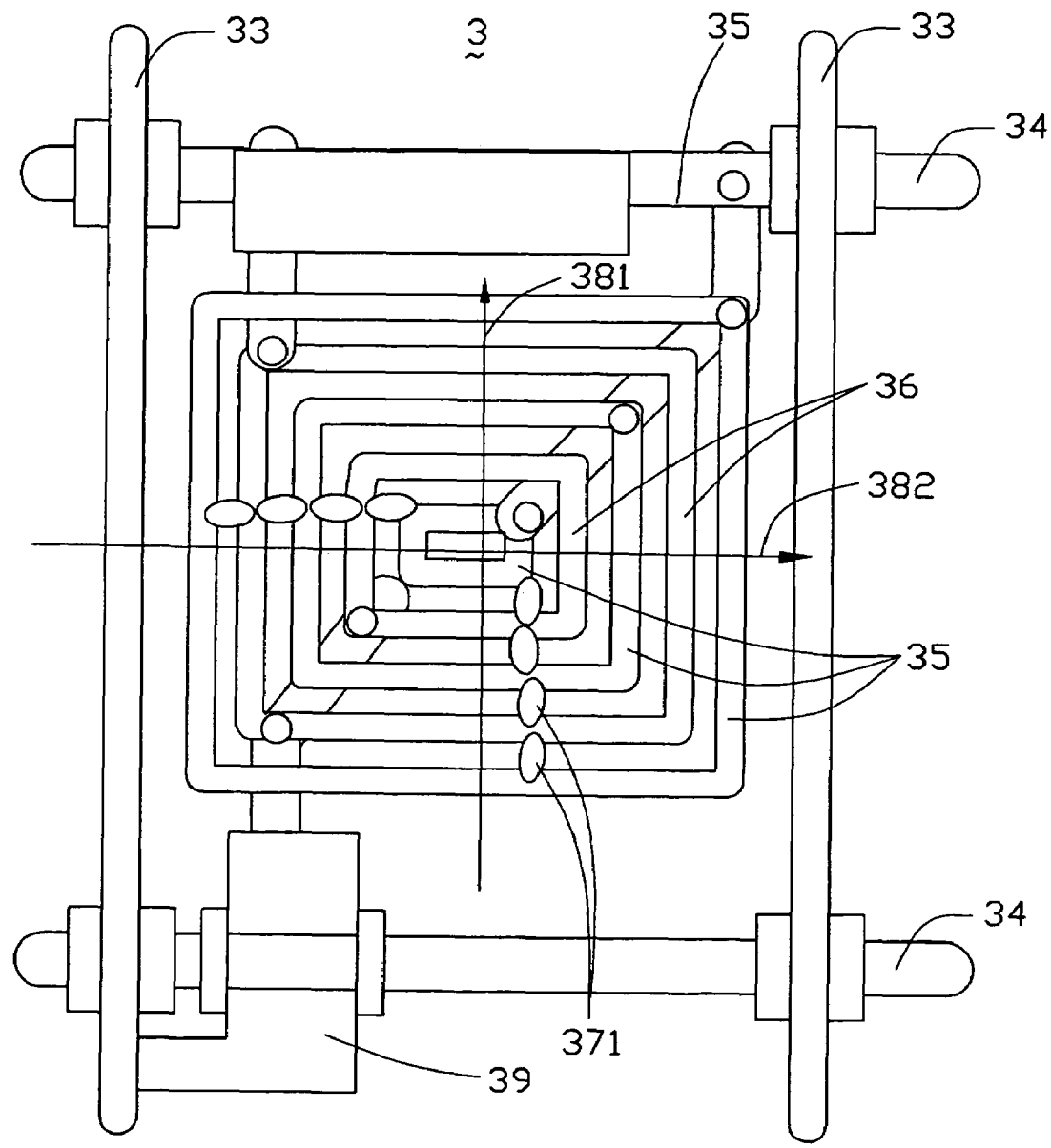
FIG. 4 is a top plan view of part of the LCD device shown in FIG. 3, showing a configuration of electrodes of the LCD device.
Figure 5:
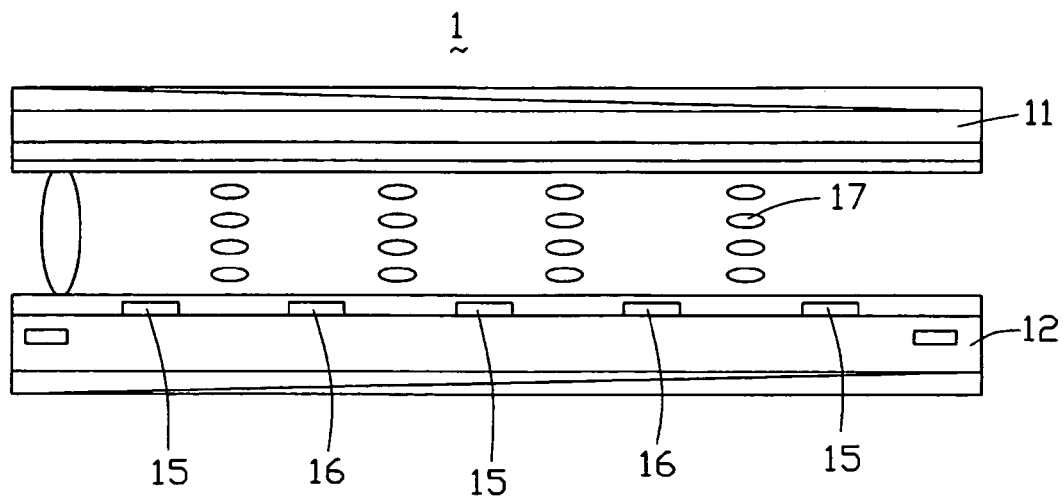
FIG. 5 is a schematic, side cross-sectional view of part of a conventional LCD device, showing the LCD device in a passive state.
Figure 6:
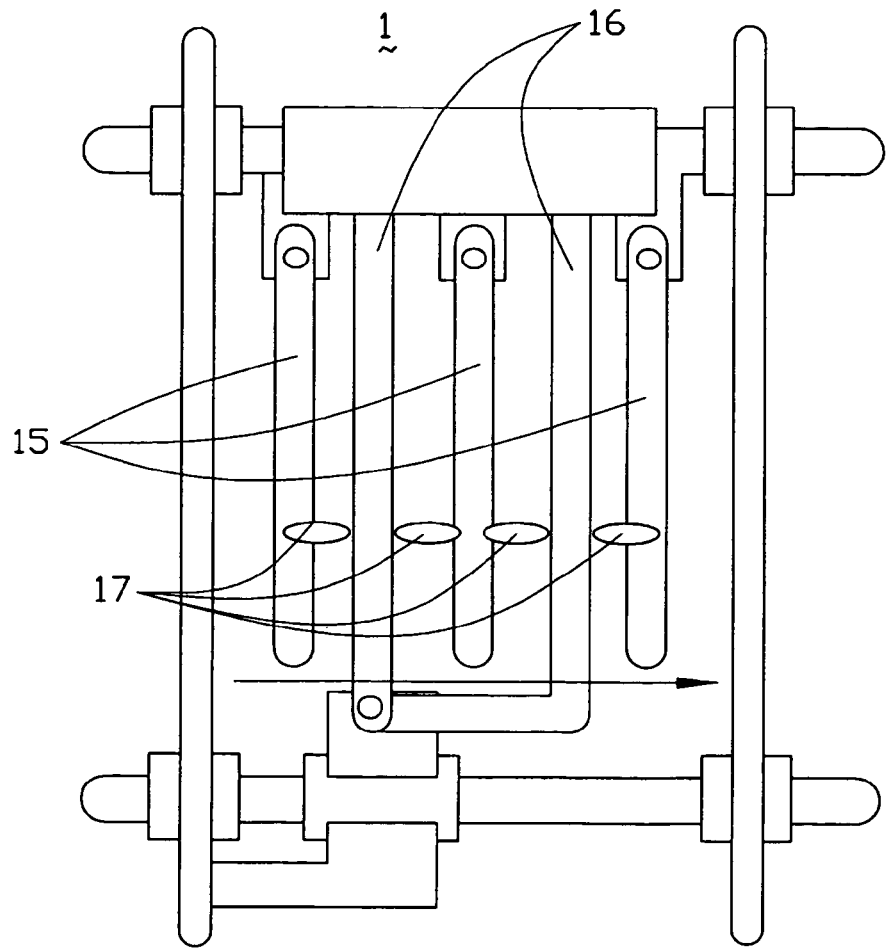
FIG. 6 is a top plan view of part of the LCD device shown in FIG. 5, showing a configuration of electrodes of the LCD device.
Figure 7:
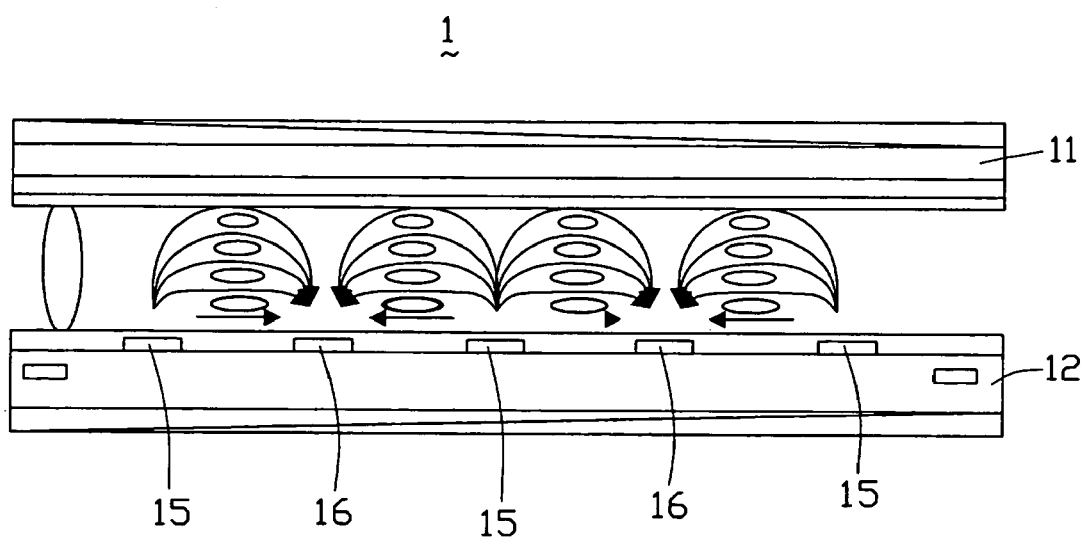
FIG. 7 is similar to FIG. 5, but showing the LCD device when a voltage is applied thereto.

Also referring to FIG. 4, two parallel gate lines 34 orthogonally cross two parallel data lines 33, thereby defining a rectangular pixel region. A TFT device 39, a plurality of the pixel electrodes 36, and a plurality of the common electrodes 35 are provided in the pixel region.

The pixel and common electrodes 36, 35 are made of a transparent conductive material such as indium-tin-oxide (ITO) or indium-zinc-oxide (IZO). The pixel and common electrodes 36, 35 are shaped as a plurality of hollow rectangles, which are alternately nested one within the other. The sides of the hollow rectangles of the pixel and common electrodes 36, 35 are substantially parallel to the data lines 33 or gate lines 34 respectively. The pixel electrodes 36 connect to a drain electrode (not labeled) of the TFT device 39.

In operation, a common voltage is applied to the common electrodes 35, and another voltage is applied to the pixel electrodes 36. A horizontal electric field in two directions 381 and 382 is thereby established. That is, the directions 381 and 382 are orthogonal to each other. Components of the electric field in the directions 381 and 382 span between respective adjacent sides of the hollow rectangles of the pixel and common electrodes 36, 35. The electric field causes liquid crystal molecules in the liquid crystal layer 37 to be twisted in a plane that is parallel to the substrates 31 and 32, for controlling a corresponding display.

According to the configuration of the common and pixel electrodes 35, 36, an electric field is generated in the directions 381 and 382 that are different from each other, so as to form two electric field regions in the spaces defined between the pixel and common electrodes 36, 35. Accordingly, the liquid crystal molecules in the liquid crystal layer 37 are twisted in the two different directions 381 and 382.

As a result, when the display screen is obliquely viewed while displaying white, two different colors can be seen in two regions of the display screen corresponding to said two regions of said spaces of the LCD device 3. The two colors compensate for each other, thereby reducing color shift.

Compared with the conventional single-domain IPS-LCD device 1 of the prior art, the liquid crystal molecules of the LCD devices 2, 3 are twisted in the two different directions 281, 282, and 381, 382 respectively. As a result, when the corresponding display screen is obliquely viewed while displaying white, two different colors can be seen in the two regions of the display screen corresponding to said two regions of said space of the respective LCD device 2, 3. Because the two colors compensate for each other, the color shift is reduced. Furthermore, the pixel and common electrodes 26, 36, 25, 35 are made of a transparent conductive material, so that the aperture ratio of the LCD devices 2, 3 is improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a pair of substrates;
   a liquid crystal layer sandwiched between the substrates;

a plurality of gate lines and data lines formed on one of the substrates, thereby defining a plurality of pixel regions; and a set of pixel electrodes and a set of common electrodes provided in each of the pixel regions;

wherein, the pixel and common electrodes are shaped as hollow rectangles, and are alternately nested one within the other.

2. The liquid crystal display device as claimed in claim 1, further comprising an insulating layer covering the set of common electrodes.

3. The liquid crystal display device as claimed in claim 2, wherein the set of pixel electrodes is located on the insulating layer.

4. The liquid crystal display device is claimed in claim 3, further comprising a passivation layer covering the set of pixel electrodes.

5. The liquid crystal display device as claimed in claim 1, wherein the pixel electrodes and the common electrodes are located at a same level relative to said one of the substrates.

6. A liquid crystal display device, comprising:
a pair of substrates;
a liquid crystal layer sandwiched between the substrates; and
a set of pixel electrodes and a set of common electrodes located between the substrates; wherein the set of pixel electrodes and the set of common electrodes respectively comprise pixel and common electrodes shaped as hollow rectangles, with the pixel and common elecrodes being alternately nested one within the other; and an electric field is generated along two perpendicular directions by the set of pixel electrodes and the set of common electrodes.

7. The liquid crystal display device as claimed in claim 6, wherein the two perpendicular directions are located in a same horizontal plane parallel to the substrates.

8. The liquid crystal display device as claimed in claim 7, wherein the set of pixel electrodes and the set of common electrodes are each formed of a transparent conductive material.

9. The liquid crystal display device as claimed in claim 8, wherein the transparent conductive material is indium-tin-oxide.

10. The liquid crystal display device as claimed in claim 8, wherein the transparent conductive material is indium-zinc-oxide.

* * * * *